(12) United States Patent
Masaka et al.

(10) Patent No.: US 10,780,610 B2
(45) Date of Patent: Sep. 22, 2020

(54) INSERT MOLDING DIE STRUCTURE

(71) Applicant: NOK CORPORATION, Tokyo (JP)

(72) Inventors: Takeshi Masaka, Kanagawa (JP); Shigeru Watanabe, Kanagawa (JP)

(73) Assignee: NOK CORPORATION (JP)

( * ) Notice: Subject to any disclaimer, the term of this patent is extended or adjusted under 35 U.S.C. 154(b) by 224 days.

(21) Appl. No.: 15/320,919

(22) PCT Filed: May 11, 2015

(86) PCT No.: PCT/JP2015/063414
§ 371 (c)(1),
(2) Date: Dec. 21, 2016

(87) PCT Pub. No.: WO2015/198722
PCT Pub. Date: Dec. 30, 2015

(65) Prior Publication Data
US 2017/0129141 A1    May 11, 2017

(30) Foreign Application Priority Data

Jun. 24, 2014  (JP) .................................. 2014-129339

(51) Int. Cl.
*B29C 33/14*  (2006.01)
*B29C 33/12*  (2006.01)
(Continued)

(52) U.S. Cl.
CPC ............ *B29C 33/14* (2013.01); *B29C 33/123* (2013.01); *B29C 33/202* (2013.01); *B29C 33/22* (2013.01);
(Continued)

(58) Field of Classification Search
CPC ..... B29C 33/14; B29C 33/302; B29C 45/561; B29C 33/202; B29C 33/123; B29C 33/22;
(Continued)

(56) References Cited

U.S. PATENT DOCUMENTS 3,586,084 A * 6/1971 Redmond ........... B29C 49/0073
206/518
6,187,247 B1 * 2/2001 Buzzell ................... B29C 45/33
264/328.1
(Continued)

FOREIGN PATENT DOCUMENTS

CN    1615213 A    5/2005
CN    1713971 A    12/2005
(Continued)

OTHER PUBLICATIONS

Extended European Search Report for Patent Application No. EP15811870.3 dated Jun. 12, 2017 (7 pages).

*Primary Examiner* — Peter L Vajda
*Assistant Examiner* — Caroline Montiel
(74) *Attorney, Agent, or Firm* — Harness, Dickey & Pierce, P.L.C.

(57) ABSTRACT

Provided is a structure in which an inserted article is easily inserted and a product is easily released from a die after molding. The structure includes a positioning mechanism which is vertically arranged on one split die, includes a positioning pin having a tapered distal end, and positions the inserted article by engaging the inserted article with the positioning pin, a stop mechanism that has a spring means assembled with the one split die and a stopper portion held by the spring means, and temporarily stops movement of the other split die when the other split die comes into contact with the stopper portion at the time of mold clamping, and a pressing mechanism that has a spring assembled with the other split die, a pusher pin, a spring assembled with the one split die, and a pusher pin, and elastically presses the inserted article by the pusher pin.

2 Claims, 4 Drawing Sheets

(51) Int. Cl.
*B29C 33/20* (2006.01)
*B29C 45/14* (2006.01)
*B29C 45/43* (2006.01)
*B29C 33/22* (2006.01)
*H01M 8/0286* (2016.01)
*B29L 31/34* (2006.01)
*H01M 8/0284* (2016.01)
*B29K 621/00* (2006.01)
*B29L 31/26* (2006.01)

(52) U.S. Cl.
CPC .............. *B29C 45/14* (2013.01); *B29C 45/43* (2013.01); *H01M 8/0286* (2013.01); *B29C 2045/14147* (2013.01); *B29C 2045/14163* (2013.01); *B29C 2045/14459* (2013.01); *B29K 2621/00* (2013.01); *B29L 2031/265* (2013.01); *B29L 2031/3468* (2013.01); *B32B 2457/18* (2013.01); *H01M 8/0284* (2013.01)

(58) Field of Classification Search
CPC .......... B29C 45/14; B29C 2045/14147; B29C 2045/14163; B29C 33/12; B29C 45/14195; B29C 45/14024; B29C 2043/3626; B29C 2043/3623; B29C 45/14065; B29K 2621/00
See application file for complete search history.

(56) References Cited

U.S. PATENT DOCUMENTS

| | | | |
|---|---|---|---|
| 6,500,376 B1 * | 12/2002 | Pack | B29C 45/1635 264/2.2 |
| 7,396,222 B2 * | 7/2008 | Saito | B29C 45/14065 264/278 |
| 2004/0227272 A1 | 11/2004 | Saito | |
| 2005/0031375 A1 | 2/2005 | Sasatani et al. | |
| 2005/0127564 A1 | 6/2005 | Van Der Aa et al. | |
| 2006/0051552 A1 | 3/2006 | Inada et al. | |
| 2006/0231977 A1 * | 10/2006 | Nicholas | B29C 33/26 264/255 |
| 2014/0246810 A1 * | 9/2014 | Kato | B29C 33/12 264/325 |

FOREIGN PATENT DOCUMENTS

| | | | | |
|---|---|---|---|---|
| CN | 101186100 A | 5/2008 | | |
| EP | 1457302 A1 * | 9/2004 | ....... | B29C 45/14065 |
| JP | H10-086188 A | 4/1998 | | |
| JP | 2000-071283 A | 3/2000 | | |
| JP | 2003-071871 | * 8/2001 | | |
| JP | 2003-071871 A | 3/2003 | | |
| JP | 2004-268456 A | 9/2004 | | |
| JP | 2008-093957 A | 4/2008 | | |
| JP | 2008-201055 A | 9/2008 | | |
| JP | 2011-073314 A | 4/2011 | | |

\* cited by examiner

INSERT MOLDING DIE STRUCTURE

CROSS-REFERENCE TO RELATED APPLICATIONS

This application is a U.S. National Stage Application of International Application No. PCT/JP2015/063414, filed on May 11, 2015, and published in Japanese as WO 2015/198722 A1 on Dec. 30, 2015. This application claims priority to Japanese Application No. 2014-129339, filed on Jun. 24, 2014. The entire disclosures of the above applications are incorporated herein by reference.

BACKGROUND OF THE INVENTION

Field of the Invention

The present invention relates to a structure of a die used to implement insert molding. For example, the die of the invention is used to mold a component part for a fuel cell. Examples of the component part for the fuel cell include a part obtained by molding a molded article such as a rubber gasket integrally with a plate-shaped inserted article such as a separator.

Description of the Conventional Art

In insert molding that requires high dimensional accuracy in a product shape after molding, positioning of an inserted article with respect to a die needs to be strictly set. For this reason, for example, as illustrated in FIG. 4(A), a positioning pin 52 is vertically arranged on one split die 51, and an inserted article I is engaged with the positioning pin 52. However, deformation such as a warp occasionally occurs in the inserted article I in a state in which preheating is not applied, and a great effort and time are required to engage the inserted article I with the positioning pin 52 while correcting deformation such as a warp.

FIG. 4(A) illustrates a state in which the inserted article I is to be inserted between the one and the other split dies 51 and 53, and a state illustrated in FIG. 4(B) is obtained when mold clamping is performed after insertion to form a molded article S such as a rubber gasket.

Further, a state illustrated in FIG. 4(C) is obtained when mold opening is performed from the state of FIG. 4(B). In this instance, the inserted article I may adhere to the other split die 53 which has a cavity 54 that forms the molded article S. Therefore, a detaching operation using an air blower 55, etc. is needed to detach the adhering inserted article I. Thus, a great effort and time are required for a mold release process after molding. In addition, this detaching operation is generally performed by a manual operation, and thus there occurs a problem that a product is easily damaged due to a human factor.

SUMMARY OF THE INVENTION

Problem to be Solved by the Invention

In view of the above point, an object of the invention is to provide a die for insert molding having a structure in which an inserted article is easily inserted and a product is easily released from a die after molding.

Means for Solving the Problem

To achieve the above object, a die structure for insert molding according to the first aspect of the invention corresponds to a die for insert molding which molds a molded article integrally with an inserted article in a state in which the inserted article is inserted between a pair of split dies, and includes a positioning mechanism vertically arranged on one split die, the positioning mechanism including a positioning pin having a tapered distal end and positioning the inserted article by engaging the inserted article with the positioning pin, a stop mechanism that has a spring means assembled with the one split die and a stopper portion held by the spring means, and temporarily stops movement of the other split die when the other split die comes into contact with the stopper portion at a time of mold clamping, and a pressing mechanism that has a spring assembled with the other split die, a pusher pin urged by the spring, a spring assembled with the one split die, and a pusher pin urged by the spring, and elastically presses the inserted article by the pusher pin urged by the spring.

In addition, a die structure for insert molding according to the second aspect of the invention is the die structure for insert molding according to the first aspect of the invention, in which both the pusher pins put and hold the inserted article therebetween from both sides in a thickness direction thereof while movement of the other split die is temporarily stopped by the other split die coming into contact with the stopper portion at the time of mold clamping, and the inserted article is disposed at a position separated from the split die at this time.

In addition, a die structure for insert molding according to the third aspect of the invention is the die structure for insert molding according to the first or second aspects of the invention, in which the spring assembled with the other split die, the pusher pin urged by the spring, the spring assembled with the one split die, and the pusher pin urged by the spring are disposed at the same position on a plane by corresponding each other.

In the die structure of the invention having the above configuration, the positioning mechanism having the positioning pin which is vertically arranged on the one split die is provided, and the distal end of the positioning pin has a tapered shape. Thus, even when deformation such as a warp occurs in the inserted article, and a position of the engaging portion (insertion hole, etc.) is shifted, the positioning pin having the tapered distal end may be engaged with (inserted into) the engaging portion. Therefore, relatively rough positioning may be performed, and thus a process of inserting the inserted article may be simplified.

In addition, in a case in which deformation such as a warp occurs in the inserted article positioned by the positioning pin, when the inserted article is pressed by immediately performing a mold clamping process, there is a concern that a defect such as breaking may occur in the inserted article. Therefore, to prevent this defect, a heating (preheating) process is preferably performed before mold clamping to correct deformation such as a warp. When this heating process is performed, heating is preferably performed while the inserted article is released from the one and the other split dies.

In this regard, the die structure of the invention includes the stop mechanism having the spring means and the stopper portion, and is set as a structure in which movement of the other split die is temporarily stopped when the other split die comes into contact with the stopper portion at the time of mold clamping. Further, the pressing mechanism having the springs and the pusher pins is provided in each of the one and the other split dies, and the pusher pins urged by the springs elastically presses the inserted article.

In this way, the other split die temporarily stops at a position before mold clamping is completed. In this instance, the pusher pin elastically presses the inserted article. As a result, the inserted article is put and held between the pusher pins from the both sides in the thickness direction thereof, and thus the inserted article may be released from the one and the other split dies. As an operation, movement of the other split die is temporarily stopped when the other split die comes into contact with the stopper portion at the time of mold clamping. In this instance, the both pusher pins put and hold the inserted article therebetween from the both sides in the thickness direction thereof. In addition, in this instance, the inserted article is disposed at a position separated from both the split dies. Both the pusher pins are preferably disposed at the same position on a plane by corresponding each other. In this way, the pusher pins may stably hold the inserted article. A heating apparatus is separately installed side by side with respect to the die of the invention or separately incorporated. In addition, this heating apparatus is preferably performed while the die of the invention is slid toward a molding apparatus.

After heating, mold clamping is resumed and completed, and a molded article is molded. Subsequently, after cooling, mold opening is performed. In these processes, the pusher pin is temporarily buried in each split die when mold clamping is completed, and protrudes from each split die in response to the dies opened. Therefore, the pusher pin presses the inserted article to separate the inserted article from each split die, and thus a mold release process may be simplified. In addition, the mold release process is automatically performed as described above, and thus occurrence of a defect due to a human factor may be prevented.

Effect of the Invention

As described in the foregoing, according to the invention, a positioning mechanism having a positioning pin vertically arranged on one split die is provided, a distal end of the positioning pin has a tapered shape, and thus a process of inserting an inserted article may be simplified. In addition, a stop mechanism having a spring means and a stopper portion and a pressing mechanism having a spring and a pusher pin are provided, and thus a mold release process may be simplified, and occurrence of a defect due to a human factor at the time of mold releasing can be prevented.

DETAILED DESCRIPTION OF PREFERRED EMBODIMENTS

The invention includes an embodiment below.

(1) A die structure in which a product positioning pin is formed in a bullet shape, and a spring mechanism that holds an upper die is provided, and a pusher pin for releasing an inserted article from a die is provided in the upper die/lower die. Further, the die structure in which upper and lower pusher pins for releasing an inserted article from a die are disposed at the same position.

(2) The bullet shape is formed by tapering the positioning pin. The spring mechanism that holds the upper die at the time of closing the upper die is provided. Preheating is performed on the die using a die slide time. The pusher pins are provided in the upper die/lower die. The pusher pin is provided in the lower die at the same position as that in the upper die.

(3-1) Rough positioning may be performed by tapering the positioning pin (only a necessary minimum is tapered in a straight portion).

(3-2) Only in (3-1), a temperature is different between the inserted article and the die, and deformation and breaking occur at the time of closing the upper die. Thus, a spring mechanism for releasing the upper die by a certain amount is provided, and deformation and breaking may be prevented.

(3-3) A temperature of the inserted article may be made equal to a temperature of the die, and a preheating process may be reduced during a die slide time while the die is held in (3-2).

(3-4) The inserted article is released from the die at the time of mold opening by providing the pusher pin in the upper die, and thus a mold release work load may be reduced, and a human factor is not incurred.

(3-5) In (3-4), the inserted article is left in the lower die, and inserted by the positioning pin which is strictly set. Thus, a work load for removal from the positioning pin is required. A product is easily pulled out when a pusher pin for removing the inserted article from the positioning pin is also provided in the lower die.

(4) A die was manufactured by taking the above scheme into consideration, and disuse of the preheating process and reduction of an inserting work load and a mold release work load were checked. As a result, while a preheating time was 100 sec, an inserting work load was 15 sec/number, and a mold release work load was 30 sec/number before a countermeasure, a preheating time was zero, an inserting work load was 5 sec/number, and a mold release work load was 5 sec/number after the countermeasure. Effects of the above scheme could be confirmed.

Embodiments

Next, an embodiment of the invention will be described according to drawings.

Figure 1A:
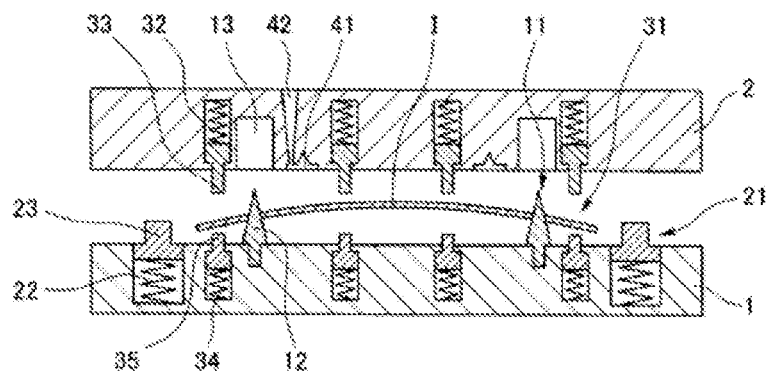
FIGS. 1A-1C are diagrams for description of an operation and are cross-sectional views of a main part of a die structure for insert molding according to an embodiment of the invention.

FIG. 1(A) illustrates a cross section of a main part of a die structure according to an embodiment of the invention. The die structure according to the embodiment is a structure in which a plate-shaped inserted article I such as a separator is inserted between a lower die 1 and an upper die 2 corresponding to a pair of split dies, and a molded article S (see FIGS. 2(E) and (F)) such as a rubber gasket is molded integrally with the inserted article I in this state. As a distinguishing configuration, a configuration below is provided in a parting portion of the lower die 1 and the upper die 2.

(1) Positioning Mechanism

Provided is a positioning mechanism 11 which has a plurality of positioning pins 12 and positions the inserted article I on a plane inside the dies when the inserted article I is engaged with the positioning pins 12 at engaging portions thereof (not illustrated).

The positioning pin 12 is vertically arranged on a plane of the lower die 1 and disposed with a distal end facing upward.

Figure 3:
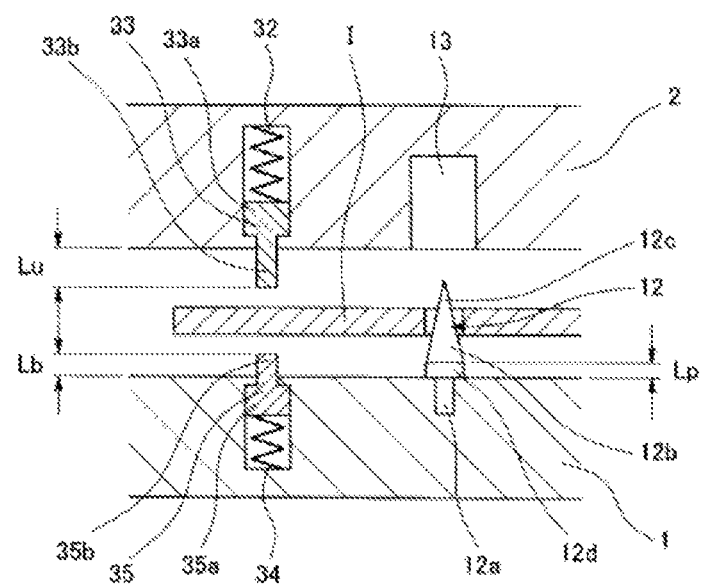
FIG. 3 is a partially enlarged cross-sectional view of the die structure.
Figure 4A:
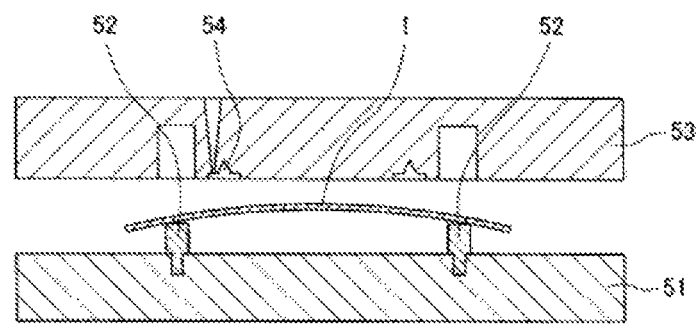
FIGS. 4A-4C are diagrams for description of an operation and are cross-sectional views of a main part of a die structure according to a conventional example.
Figure 4B:
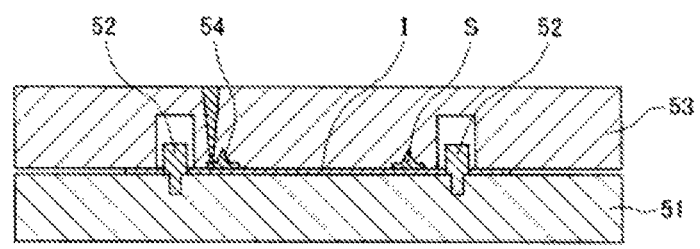
Figure 4C:
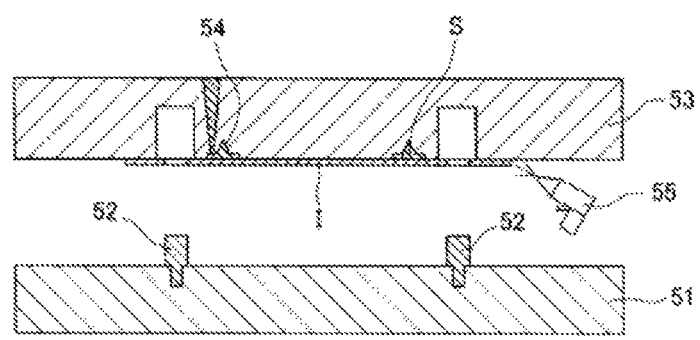

As enlarged and illustrated in FIG. 3, the positioning pin 12 integrally has a fixed portion 12a buried in the lower die 1 and a protruding portion 12b protruding on the lower die 2. Further, a distal end side of the protruding portion 12b is configured as a tapered portion 12c having a tapering shape, and a straight portion 12d having constant diameter dimensions is provided between the tapered portion 12c and the fixed portion 12a. A space portion 13 for receiving the positioning pin 12 is provided on the upper die 2.

(2) Stop Mechanism

Provided is a stop mechanism 21 which has a plurality of spring means 22 assembled with the lower die 1 and a plurality of stopper portions 23 held by the spring means 22, and temporarily stops movement (descent) of the upper die 2 when the upper die 2 comes into contact with the stopper portions 23 at the time of mold clamping. The stopper portion 23 may be an end portion of the spring means 22, that is, the stop mechanism 21 may only have the spring means 22.

(3) Pressing Mechanism

Provided is a pressing mechanism 31 which has a plurality of springs 32 assembled with the upper die 2 and a plurality of pusher pins 33 urged by the springs 32, has a plurality of springs 34 assembled with the lower die 1 and a plurality of pusher pins 35 urged by the springs 34, and elastically presses the inserted article I through the pusher pins 33 and 35 urged by the springs 32 and 34.

As enlarged and illustrated in FIG. 3, the respective pusher pins 33 and 35 integrally have piston portions (head portions) 33a and 35a slidably assembled inside cylinders of the lower die 1 or the upper die 2 and pin portions 33b and 35b protruding from the piston portions 33a and 35a. The pusher pin 33 assembled with the upper die 2 is urged by the spring 32, and a distal end thereof protrudes downward from the upper die 2. However, the whole pin is buried inside the upper die 2 in a mold clamping state. Meanwhile, the pusher pin 35 assembled with the lower die 1 is urged by the spring 34, and a distal end thereof protrudes upward from the lower die 1. However, the whole pin is buried inside the lower die 1 in the mold clamping state.

The spring 32 and the pusher pin 33 assembled with the upper die 2 and the spring 34 and the pusher pin 35 assembled with the lower die 1 are disposed at the same position on a plane by corresponding each other.

In addition, as illustrated in FIG. 3, the maximum amount of protrusion (protruding amount) Lb of the pusher pin 35 assembled with the lower die 1, a length Lp of the straight portion 12d in the positioning pin 12, a spring force Fu of the spring 32 assembled with the upper die 2, and a spring force Fb of the spring 34 assembled with the lower die 1 are set to satisfy relations of $Lb \geq Lp$ $Fu \geq Fb.$ In addition, a cavity space 41 for molding the molded article S such as the rubber gasket is provided on a lower surface of the upper die 2, and a material flow passage 42 for supplying a molding material to the cavity space 41 is provided in the upper die 2.

Next, an operation of the die structure will be described. The product is molded in a procedure below using this die.

(a) Insertion

FIG. 1(A) illustrates a state in which the lower die 1 and the upper die 2 are open, and the inserted article I is inserted between the lower die 1 and the upper die 2 in this state. A warp is generated in the inserted article I, and the inserted article I is inserted while having the warp. Since the positioning pin 12 includes the tapered portion 12c having the tapering shape at a distal end, insertion is regarded as rough positioning in which the inserted article I is caught on the tapered portion 12c.

(b) Upper Die Closing

Figure 1B:
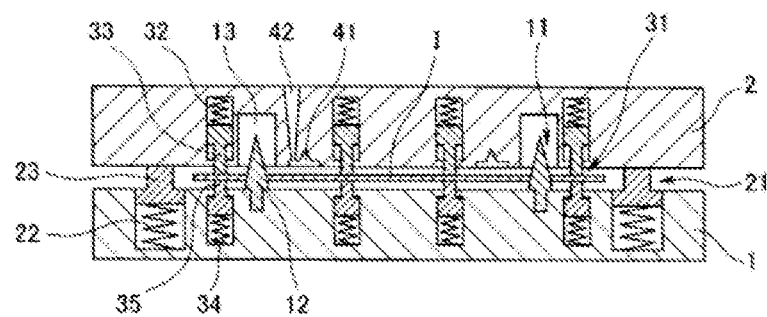

When the upper die 2 is lowered by starting mold clamping from the state of FIG. 1(A), descent of the upper die 2 temporarily stops due to a spring force of the spring means 22 by the upper die 2 coming into contact with the stopper portion 23 as illustrated in FIG. 1(B). In this instance, the upper and lower pusher pins 33 and 35 put and hold the inserted article I therebetween from both sides in a thickness direction thereof, and externally eliminate the warp. The inserted article I is held while being released (separated) from both the lower die 1 and the upper die 2.

(c) Die Slide

Figure 1C:
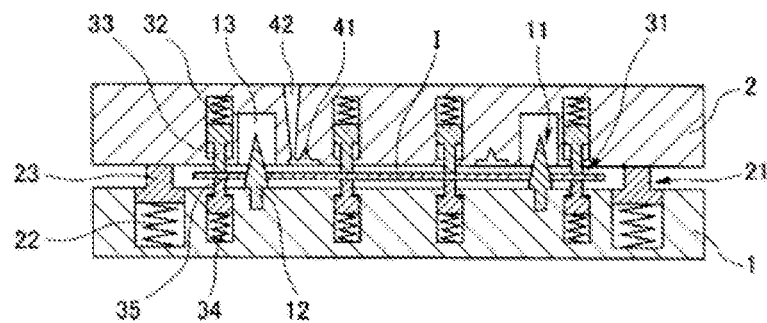

Subsequently, as illustrated in FIG. 1(C), the whole die is slid toward a molding apparatus (not illustrated), and a heating apparatus (not illustrated) is operated during sliding, thereby eliminating the warp from the inserted article I. The heated inserted article I is in a state in which the inserted article I easily enters deep in the positioning pin 12.

(d) Mold Clamping

Figure 2D:
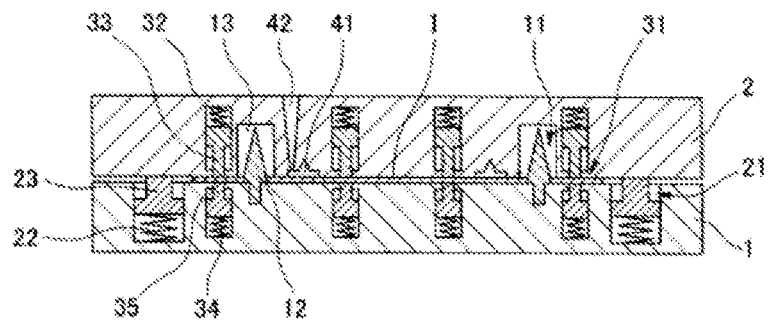
FIGS. 2D-2F are diagrams for description of an operation and are cross-sectional views of the main part of the die structure.

Subsequently, as illustrated in FIG. 2(D), mold clamping is resumed and completed. The upper and lower pusher pins 33 and 35 are buried inside the lower die 1 or the upper die 2, and the inserted article I is directly sandwiched by the lower die 1 and the upper die 2. In addition, the inserted article I is accurately positioned by the straight portion 12d of the positioning pin 12.

(e) Molding (Injection/Vulcanization)

Figure 2E:
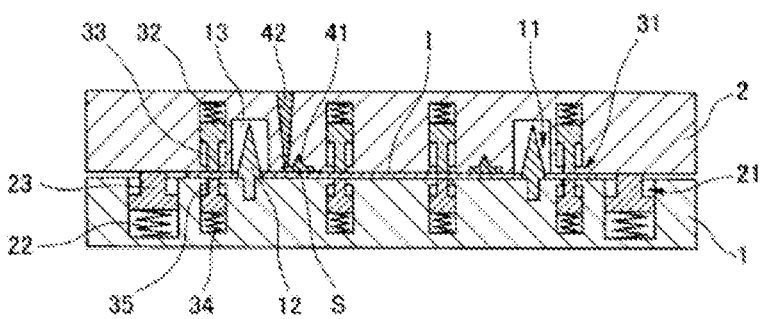

Subsequently, as illustrated in FIG. 2(E), the molding material is supplied to the cavity space 41 from the material flow passage 42, and the molded article S such as the rubber gasket is molded. Molding is performed according to an injection molding method. However, another molding method such as a compression molding method may be employed.

(f) Mold Opening (Mold Completion)

Figure 2F:
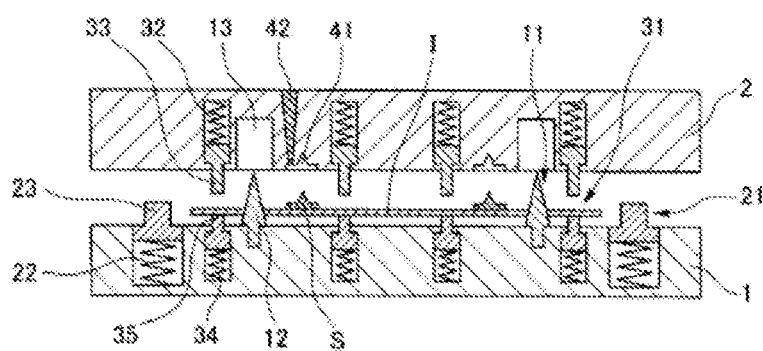

Subsequently, as illustrated in FIG. 2(F), mold opening is performed. In the die, as described above, the pusher pin 33 is disposed in the upper die 2, and thus the inserted article I emerges from the upper die 2 in a mold release state at the time of mold opening after completing molding. At the same time, the inserted article I is removed from the straight portion 12d of the positioning pin 12 by the pusher pin 35 disposed in the lower die 1, and thus the product may be pulled out without any difficulty. In this instance, when the upper and lower pusher pins 33 and 35 are not disposed at the same position on a plane, there is a concern that moment acts to deform the inserted article I. However, in the die, the upper and lower pusher pins 33 and 35 are disposed at the same position on the plane, and thus the inserted article I is not deformed. With regard to the spring forces of the upper and lower springs 32 and 34, as described above, when the spring force of the spring 32 assembled with the upper die 2 is set to Fu, and the spring force of the spring 34 assembled with the lower die 1 is set to Fb, it is preferable to establish a relation of $Fu \geq Fb.$

What is claimed is:

1. A structure of a die for insert molding
a first split die and a second split die that are configured for receipt of an inserted article therebetween, and configured to mold a molded article to the inserted article when inserted therebetween,
a molding cavity formed in the second split die having a shape that corresponds to that of the molded article, and a material flow passage formed in the second split die that communicates with the molding cavity;
a positioning mechanism vertically arranged on the first split die, the positioning mechanism including a positioning pin having a tapered distal end, and the positioning mechanism being configured to position the inserted article by engaging the inserted article with the positioning pin;
a stop mechanism that has a spring means attached to the first split die and a stopper portion attached to the spring means, the stop mechanism being configured to temporarily stop movement of the second split die when the second split die comes into contact with the stopper portion at a time of mold clamping;
an outer pressing mechanism configured to engage outer edges of the inserted article, the outer pressing mechanism having:
  a first spring attached to the second split die;
  a first pusher pin urged by the first spring;
  a second spring attached to the first split die; and
  a second pusher pin urged by the second spring; and
an interior pressing mechanism configured to engage portions of the inserted article that are located inboard from the outer edges, the interior pressing mechanism having:
  a third spring attached to the second split die;
  a third pusher pin urged by the third spring;
  a fourth spring attached to the first split die; and
  a fourth pusher pin urged by the fourth spring,
wherein the inserted article is initially in a deformed state when placed in the die for insert molding;
the first and second pusher pins locate and hold the outer edges of the inserted article therebetween on opposing sides thereof in a thickness direction of the inserted article while movement of the second split die is temporarily stopped by the second split die coming into contact with the stopper portion at the time of mold clamping, and the third and fourth pusher pins locate and hold the portions of the inserted article located inboard from the outer edges therebetween on opposing sides thereof in the thickness direction of the inserted article while movement of the second split die is temporarily stopped by the second split die coming into contact with the stopper portion at the time of mold clamping; and the inserted article is disposed at a position that is separated from the second split die at this time during which the outer and interior pressing mechanisms are configured to remove the deformity when engaged with the inserted article by elastically pressing the inserted article with the first, second, third, and fourth pusher pins urged by the first, second, third, and fourth springs,
the molding cavity is positioned between the outer pressing mechanism and the interior pressing mechanism, and
the stop mechanism is positioned outside of the outer pressing mechanism.

2. The structure of a die for insert molding according to claim 1, wherein the first spring attached to the second split die, the first pusher pin urged by the first spring, the second spring attached to the first split die, and the second pusher pin urged by the second spring are disposed at the same position on a plane by corresponding to each other.

* * * * *